(12) United States Patent
Moser et al.

(10) Patent No.: US 11,861,181 B1
(45) Date of Patent: Jan. 2, 2024

(54) TRIPLE MODULAR REDUNDANCY (TMR) RADIATION HARDENED MEMORY SYSTEM

(71) Applicant: BAE SYSTEMS Information and Electronic Systems Integration Inc., Nashua, NH (US)

(72) Inventors: David D. Moser, Haymarket, VA (US); Richard J. Ferguson, Bealeton, VA (US); Daniel L. Stanley, Warrenton, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 17/818,850

(22) Filed: Aug. 10, 2022

(51) Int. Cl.
  *G06F 11/07* (2006.01)
  *G06F 3/06* (2006.01)
  *G06F 11/14* (2006.01)

(52) U.S. Cl.
  CPC .......... *G06F 3/0619* (2013.01); *G06F 3/0652* (2013.01); *G06F 3/0653* (2013.01); *G06F 3/0673* (2013.01); *G06F 11/0772* (2013.01); *G06F 11/141* (2013.01)

(58) Field of Classification Search
  CPC .. G06F 11/0772; G06F 11/141; G06F 3/0619; G06F 3/0652; G06F 3/0673
  See application file for complete search history.

(56) References Cited

U.S. PATENT DOCUMENTS

| 6,141,769 | A  | 10/2000 | Petivan et al. |
| 6,903,571 | B1 | 6/2005  | Trimberger     |
| 7,250,786 | B1 | 7/2007  | Trimberger     |
| 7,260,742 | B2 | 8/2007  | Czajkowski     |

(Continued)

FOREIGN PATENT DOCUMENTS

| EP | 1054326 A1    | 10/2003 |
| IN | 202241039022 A | 7/2022 |
| WO | 2022079463 A1 | 4/2022 |

OTHER PUBLICATIONS

International Search Report, PCT/US23/28210, dated Oct. 19, 2023, 8 pages.

*Primary Examiner* — Nadeem Iqbal
(74) *Attorney, Agent, or Firm* — Finch & Maloney PLLC

(57) ABSTRACT

Techniques are provided for a radiation hardened memory system. A memory system implementing the techniques according to an embodiment includes a redundancy comparator configured to detect differences between data stored redundantly in a first memory, a second memory, and a third memory. The redundancy comparator is further configured to identify a memory error based on the detected differences. The memory system also includes an error collection buffer configured to store a memory address associated with the memory error, and a memory scrubber circuit configured to overwrite, at the memory address associated with the memory error, erroneous data with corrected data. The corrected data is based on a majority vote among the three memories. The memory system further includes a priority (Continued)

arbitrator configured to arbitrate between the memory scrubber overwriting and functional memory accesses associated with software execution performed by a processor configured to utilize the memory system.

20 Claims, 6 Drawing Sheets

(56) References Cited

U.S. PATENT DOCUMENTS

| | | |
|---|---|---|
| 7,298,168 B1 | 11/2007 | Steiner |
| 8,423,837 B2 | 4/2013 | Madan et al. |
| 8,489,919 B2 | 7/2013 | Clark et al. |
| 8,589,737 B2 | 11/2013 | Rohleder et al. |
| 8,972,819 B2 | 3/2015 | Morris et al. |
| 9,098,445 B2 | 8/2015 | Meir et al. |
| 9,201,726 B2 | 12/2015 | Morris et al. |
| 9,389,954 B2 | 7/2016 | Pelley et al. |
| 9,524,113 B2 | 12/2016 | Baryudin |
| 9,575,862 B1 | 2/2017 | Hutton et al. |
| 9,583,215 B2 | 2/2017 | Jeong et al. |
| 10,318,376 B2 | 6/2019 | Yamada et al. |
| 10,466,937 B2 | 11/2019 | Berger |
| 10,579,536 B2 | 3/2020 | Clark |
| 11,379,306 B1 | 7/2022 | Ross et al. |
| 2010/0268987 A1 | 10/2010 | Clark et al. |
| 2010/0269022 A1 | 10/2010 | Clark et al. |
| 2013/0336060 A1 | 12/2013 | Arakawa |
| 2022/0300167 A1* | 9/2022 | Wu .................. G06F 3/0673 |

* cited by examiner

TRIPLE MODULAR REDUNDANCY (TMR) RADIATION HARDENED MEMORY SYSTEM

FIELD OF DISCLOSURE

The present disclosure relates to memory systems, and more particularly to the use of triple modular redundancy (TMR) memory systems to provide radiation hardened memory operation.

BACKGROUND

Memory systems deployed in space-based applications are subjected to relatively high radiation levels which can cause a significant increase in single-bit, multi-bit, and single event functional interrupt (SEFI) errors. In some cases, these errors can render the memory non-functional. Shielding can reduce the radiation exposure, but this approach is impractical due to the added weight (e.g., requiring lead or similarly dense materials), particularly in space-based applications where stringent weight constraints may be imposed.

Figure 1:
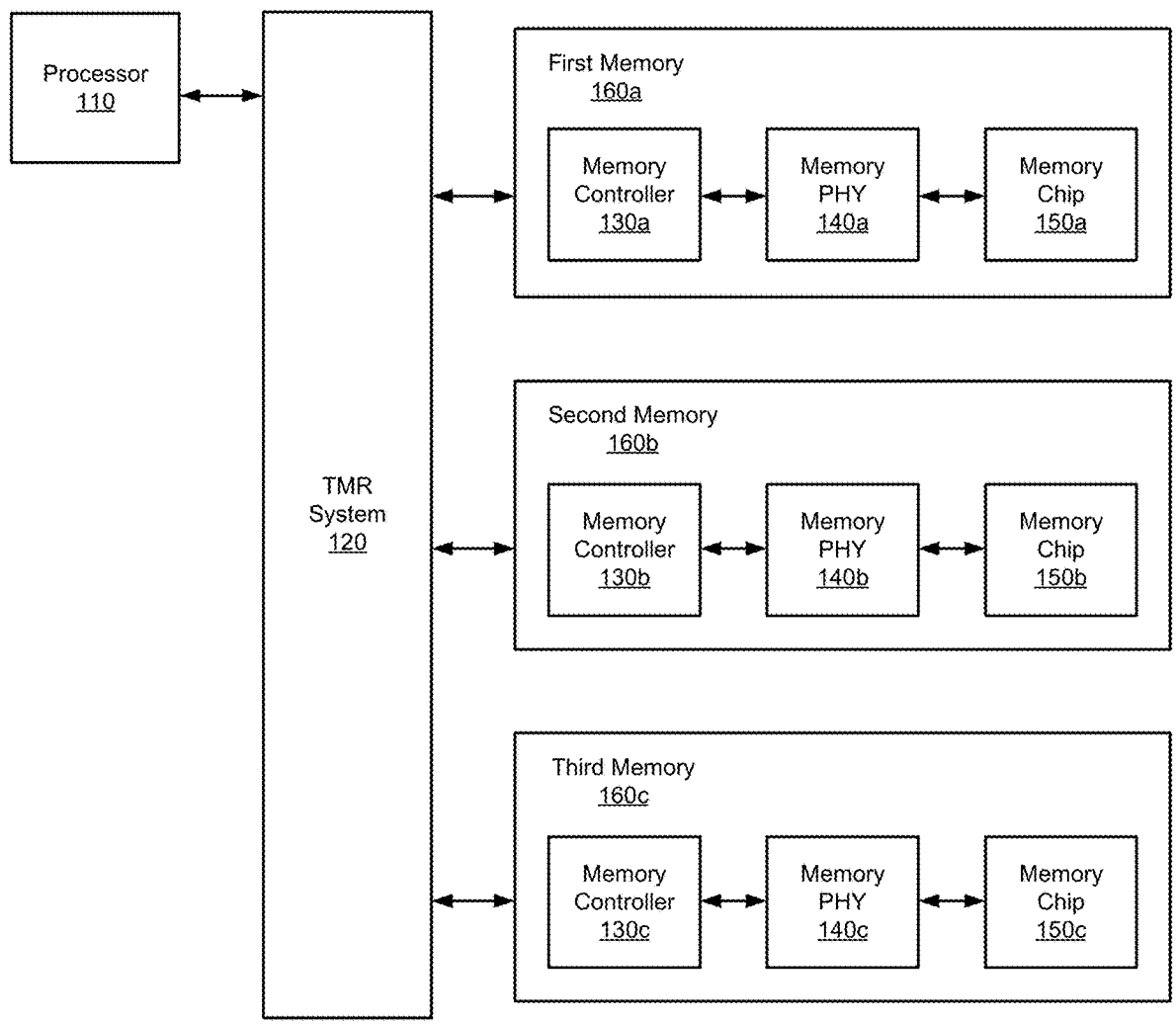
FIG. 1 illustrates an implementation of a triple modular redundancy (TMR) memory system, in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Techniques are provided herein for a triple modular redundancy (TMR) memory system configured to provide radiation hardened memory operation. As noted above, memory systems deployed in space-based applications are subjected to relatively high radiation levels which can cause a significant increase in single-bit, multi-bit, and single event functional interrupt (SEFI) errors. In some cases, these errors can render the memory at least temporarily non-functional. Shielding can reduce the radiation exposure, but this approach is impractical due to the added weight (e.g., requiring lead or similarly dense materials), particularly in space-based applications where stringent weight constraints may be imposed.

One approach to solving this problem is to modify the design of a commercially available memory controller and/ or the associated physical interface (PHY) to a commercial memory chip (e.g., integrated circuit or IC), to include circuitry to correct bit errors. This approach, however, is generally not capable of correcting lengthier sequences of bit errors (e.g., Single Event Functional Interrupt or SEFI conditions). This approach also tends to slow down the operation of the memory, making it incompatible with increasingly faster memory chips such as faster Double Data Rate 4 (DDR4) and DDR5 memory chips. Additionally, PHY development is costly and time consuming. For example, it can take a year or more to develop a PHY.

To this end, and in accordance with an embodiment of the present disclosure, a TMR memory system is disclosed which interfaces between a processor and a commercially available memory controller/PHY for the memory chip without requiring modification of the memory controller/PHY. The TMR memory system provides improved reliability for memory operation in higher radiation environments such as space-based applications. The disclosed system employs triple redundant memories and associated circuitry to perform memory scrubbing and error recovery in balance with the execution, by the processor, of mission software from those memories, as will be explained in greater detail below. The disclosed TMR memory system can be used, for instance, with electronic systems in a wide variety of applications including, for example, radar systems and communication systems that can be deployed in space-based applications (e.g., satellite-based platform) or other high radiation environments, although other applications will be apparent.

In accordance with an embodiment, the TMR memory system, which interfaces between a processor and a memory controller/PHY, includes a redundancy comparator configured to detect differences between data stored redundantly in a first memory, a second memory, and a third memory. The redundancy comparator is further configured to identify a memory error based on the detected differences. The memory system also includes an error collection buffer configured to store a memory address associated with the memory error. The memory system further includes a memory scrubber circuit configured to overwrite, at the memory address associated with the memory error, erroneous data with corrected data. The corrected data is based on a majority vote among the three memories. The memory system further includes a priority arbitrator configured to arbitrate between the memory scrubber overwriting operations and functional memory accesses associated with software execution performed by a processor configured to utilize the memory system (e.g., the mission application).

It will be appreciated that the techniques described herein may provide improved error correction and recovery capabilities, in terms of cost, reliability, and operational speed, compared to systems that provide physical shielding or that require modification of the memory controller/PHY. Numerous embodiments and applications will be apparent in light of this disclosure.

System Architecture

FIG. 1 illustrates an implementation 100 of a TMR memory system, in accordance with certain embodiments of the present disclosure. The implementation 100 is shown to include a processor 110, the TMR system 120, and three redundant memory systems 160a, 160b, and 160c. Each of the redundant memory systems 160 is shown to include a memory controller 130, a memory PHY 140 and a memory chip 150. In some embodiments, these components 130, 140, and 150 may be any suitable chips including commercially available chips. The redundant memory systems 160 are each configured to store and provide read/write access to a copy of the software and data used by the processor 110, for example in the execution of a mission application (e.g., signal processing, radar processing, communications, etc.). In the absence of any bit errors, the copies of software and data stored in the three memory chips 150a, 150b, and 150c would be identical, and so the redundancy serves to identify such errors based on differences that may be detected. While the use of three memory chips allow for the use of a majority voting scheme, as will be described below, in some embodiments, additional memory chips may be employed for increased redundancy.

The operation of the TMR system 120 will be described in greater detail below, but at a high level, the TMR system is configured to interface between the processor 110 and the triple redundant memories and to exploit the redundancy to detect and correct errors (e.g., errors caused by radiation effects or from other sources).

Figure 2:
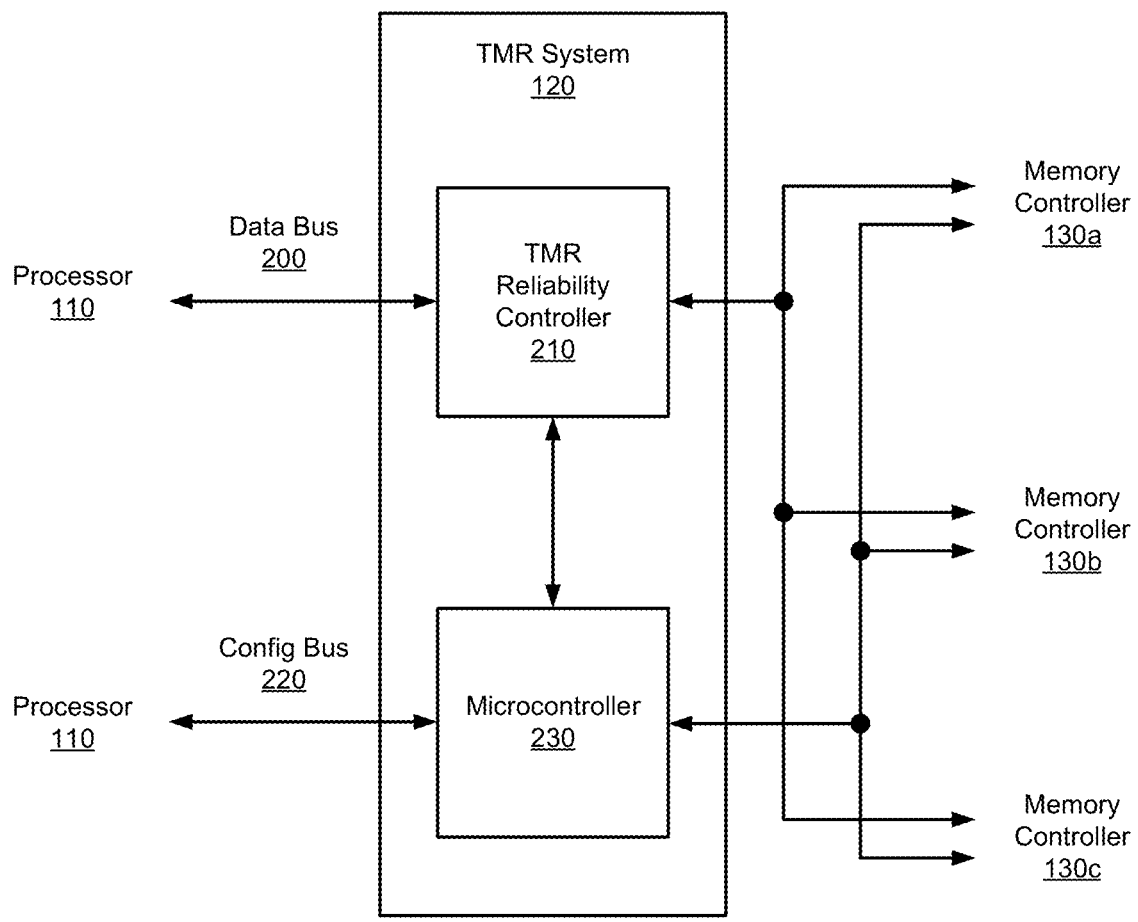
FIG. 2 is a block diagram of the TMR memory system of FIG. 1, configured in accordance with certain embodiments of the present disclosure.

FIG. 2 is a block diagram of the TMR memory system 120 of FIG. 1, configured in accordance with certain embodiments of the present disclosure. The TMR system is shown to include a TMR reliability controller 210 and a microcontroller 230. The operation of the TMR reliability controller 210 and microcontroller 230 will be described in greater detail below. At a high level, however, the TMR reliability controller 210 is configured to allow the processor 110 to read and write data over data bus 200 to the memory chips 150, through the memory controller 130 and memory PHY 140, and to provide increased protection against memory errors. In some embodiments, the microcontroller 230 communicates with the processor 110 over a configuration bus 220 and is configured to adjust various parameters associated with the operation of the TMR reliability controller 210 and provide overall control of the TMR system 120, as will be explained in greater detail below.

Figure 3:
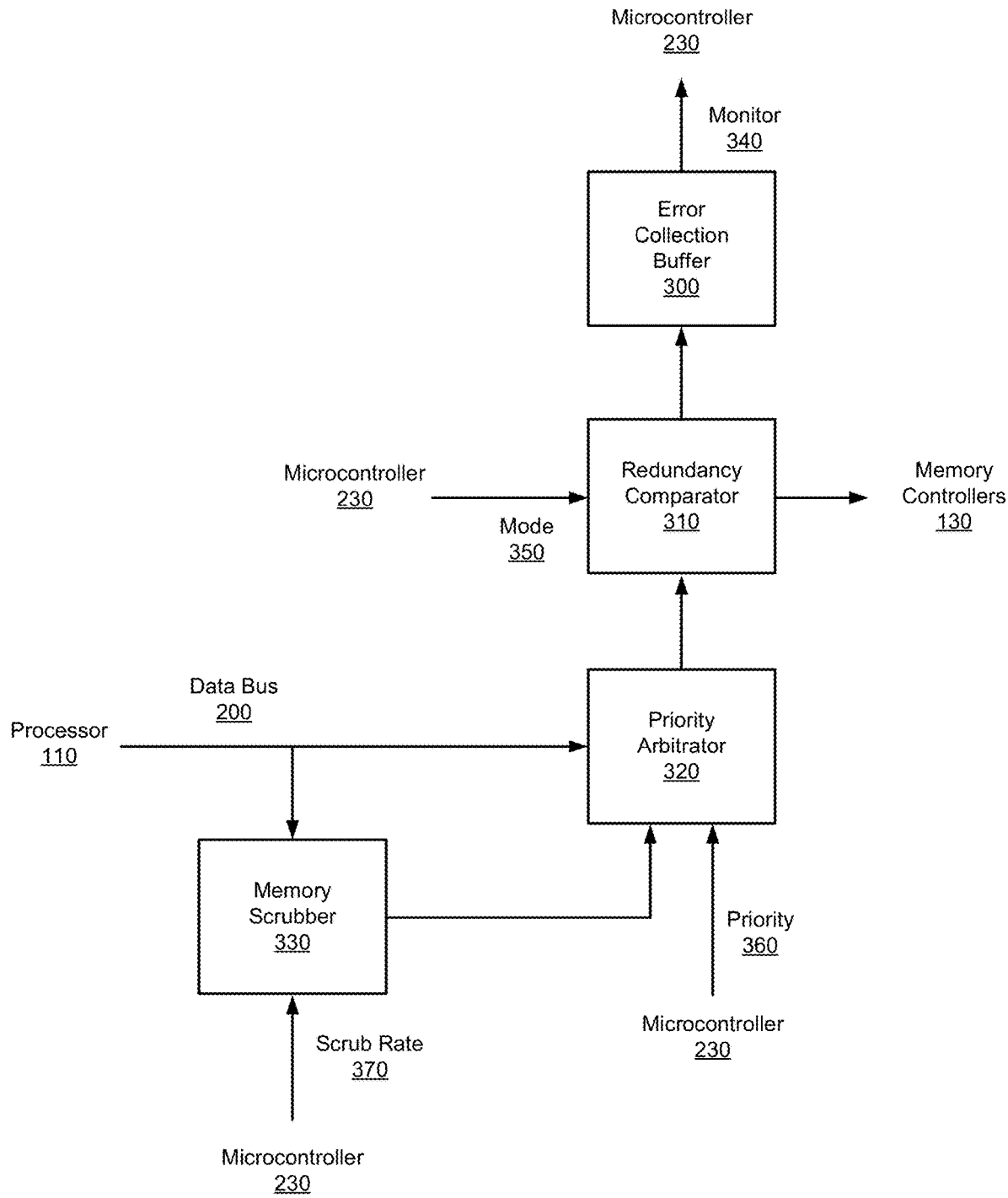
FIG. 3 is a block diagram of the TMR reliability controller of FIG. 2, configured in accordance with certain embodiments of the present disclosure.

FIG. 3 is a block diagram of the TMR reliability controller 210 of FIG. 2, configured in accordance with certain embodiments of the present disclosure. TMR reliability controller 210 is shown to include an error collection buffer 300, a redundancy comparator 310, a priority arbitrator 320, and a memory scrubber 330. The components of the TMR reliability controller operate under the control of the microcontroller 230.

The redundancy comparator 310 is configured to detect differences between data that is stored redundantly in the three memories 160 and to identify memory errors based on the detected differences. The redundancy comparator 310 accesses the redundant memory chips 150 through the memory controllers 130 and PHYs 140 using any appropriate technique associated with the particular memory controller/PHY that has been selected for use in the application. Errors that are discovered are stored in the error collection buffer 300 which is configured to store the memory address associated with each memory error. In some embodiments, the error collection buffer 300 may be implemented as a circular buffer which can be monitored 340 by the microcontroller 230. In some embodiments, the error collection buffer may be configured to generate an interrupt to the microcontroller 230 to signal the presence of new errors.

The memory scrubber circuit 330 is configured to overwrite erroneous data with corrected data, at the memory address associated with the memory error. The corrected data is generated based on a majority vote performed among the first memory 160a, the second memory 160b, and the third memory 160c. A random bit error, caused for example by radiation, is relatively unlikely to occur in the same address and bit position of two or more of the memories, and so a majority vote can be used to correct the error in one of the memories based on a consensus value obtained from the other two memories. Since only the memory address associated with the memory error is stored, the memory overwrite operation is a Read-Modify-Write memory operation, allowing the erroneous data to be re-read, repaired, and written back to the memory at that address.

In some embodiments, the rate at which memory scrubbing is performed can be set by the microcontroller 230 through scrub rate signaling 370. For example, the scrub rate can be increased when a SEFI occurs, as will be described below.

The memory scrubber circuit is also configured to monitor traffic on the data bus 200 to determine if a functional memory write is being performed by the processor 110 to a memory address that is in the process of being scrubbed (e.g., about to be overwritten for correction). If that is the case, then the memory scrubber cancels the overwrite since it will not be necessary and could potentially corrupt the memory if performed after the processor completes the functional write.

The priority arbitrator 320 is configured to arbitrate between the overwriting performed by the memory scrubber and the functional memory accesses associated with software execution performed by the processor 110. The priority arbitrator throttles the scrubbing rate based on guidance (priority signaling 360) provided by the microcontroller 230, as will be described below.

In some embodiments, the TMR reliability controller 210 may also be configured to employ an Error Correction Coding (ECC) technique of any suitable type to detect and repair errors as an additional mechanism to the memory scrubbing process. This function may be switched on or off based on a mode setting 350 provided by the microcontroller 230.

Figure 4:
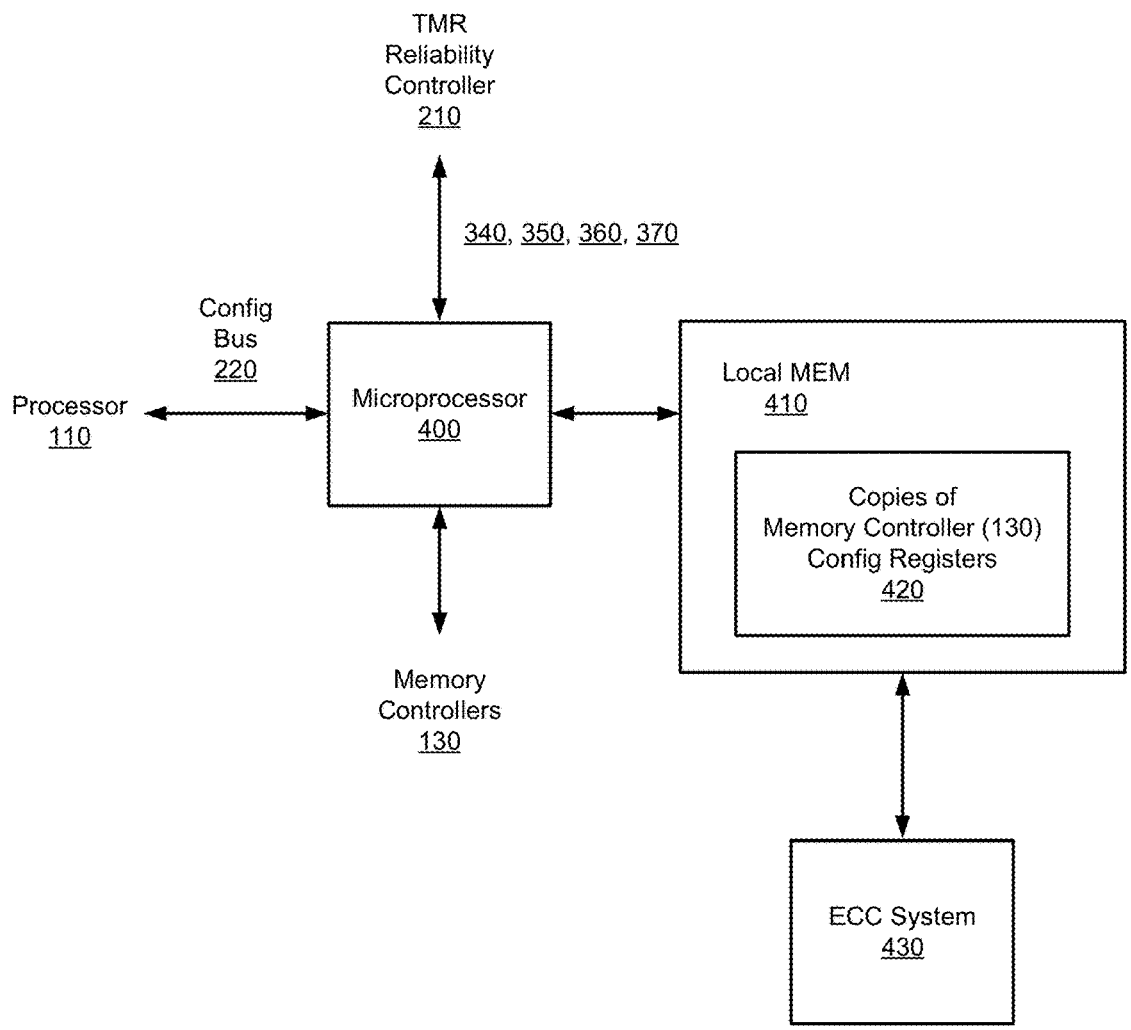
FIG. 4 is a block diagram of the microcontroller of FIG. 2, configured in accordance with certain embodiments of the present disclosure.

FIG. 4 is a block diagram of the microcontroller 230 of FIG. 2, configured in accordance with certain embodiments of the present disclosure. The microcontroller 230 is shown to include a microprocessor 400, a local memory 410, and an ECC system 430.

The microprocessor 400 is configured to monitor 340 the error collection buffer 300 of the TMR reliability controller 210 and trigger operation of the memory scrubber circuit 330 in response to memory errors that have been stored in the buffer. In some embodiments, the monitoring may be performed by reading the buffer. In some embodiments, the monitoring may be accomplished through interrupts generated by the buffer when errors are stored. The microprocessor may clear the errors from the buffer after detection.

The microprocessor 400 is also configured to determine whether the errors retrieved from the buffer are relatively simple single bit errors, or whether the errors are multi-bit errors or are associated with a more serious SEFI condition that requires reinitialization of one or more of the memory controllers 130 in addition to memory scrubbing (e.g., operating in a SEFI recovery mode).

The local memory 410 is configured to store copies of the contents 420 of the configuration register of the memory controllers 130 so that these copies may be used to restore or refresh the memory controllers in response to detection of a SEFI condition. In some embodiments, the microprocessor may increase the scrub rate 370 during SEFI recovery and/or turn off error collection for the memory that is undergoing SEFI recovery, to allow for a faster recovery from this more serious error condition.

In some embodiments, the microprocessor may set the priority 360 for the priority arbitrator 320 based on a tradeoff between the overwriting performed by the memory scrubber and the functional memory accesses of the processor 110. That priority may be determined based on guidance from the processor 110, provided on the configuration bus 220, and may be related to mission parameters or other considerations. For example, in some cases, correcting errors may be of primary importance to mission success, and so overwriting by the memory scrubber may be set to a higher priority. However, in other cases, allowing the processor to execute mission software with minimal interruption due to error correction may be of primary importance to mission success, and so functional memory accesses by the processor may be set to a higher priority.

In some embodiments, the microcontroller 230 may power cycle the external memory 150a, 150b, or 150c to clear invalid states that are non-recoverable by reset or command.

In some embodiments, the microprocessor may control the mode setting 350 to cause the TMR reliability controller to include or exclude ECC functionality as an additional operation to the scrubbing function. Determination of the mode setting may be made, in part by based on guidance from the processor 110, also provided on the configuration bus 220.

In some embodiments, the microprocessor may be configured to monitor the rate at which errors are being detected through the error collection buffer 300 and detect an increase or decrease in those error rates. In response to detection of such a change in error rates, the microprocessor may increase or decrease the scrub rate 370 accordingly.

In some embodiments, an ECC system 430 is configured to maintain the integrity of the local memory by employing any suitable ECC technique to detect and correct errors that may occur in the local memory 410.

In some embodiments, the microprocessor 400 may be configured to detect stuck bit errors, in which the bit remains stuck in a one or zero state despite repeated scrubbing attempts. Stuck bits may be reported back to the processor 110 over the configuration bus 220 so that the processor may attempt to avoid using memory locations that contain stuck bits.

Methodology

Figure 5:
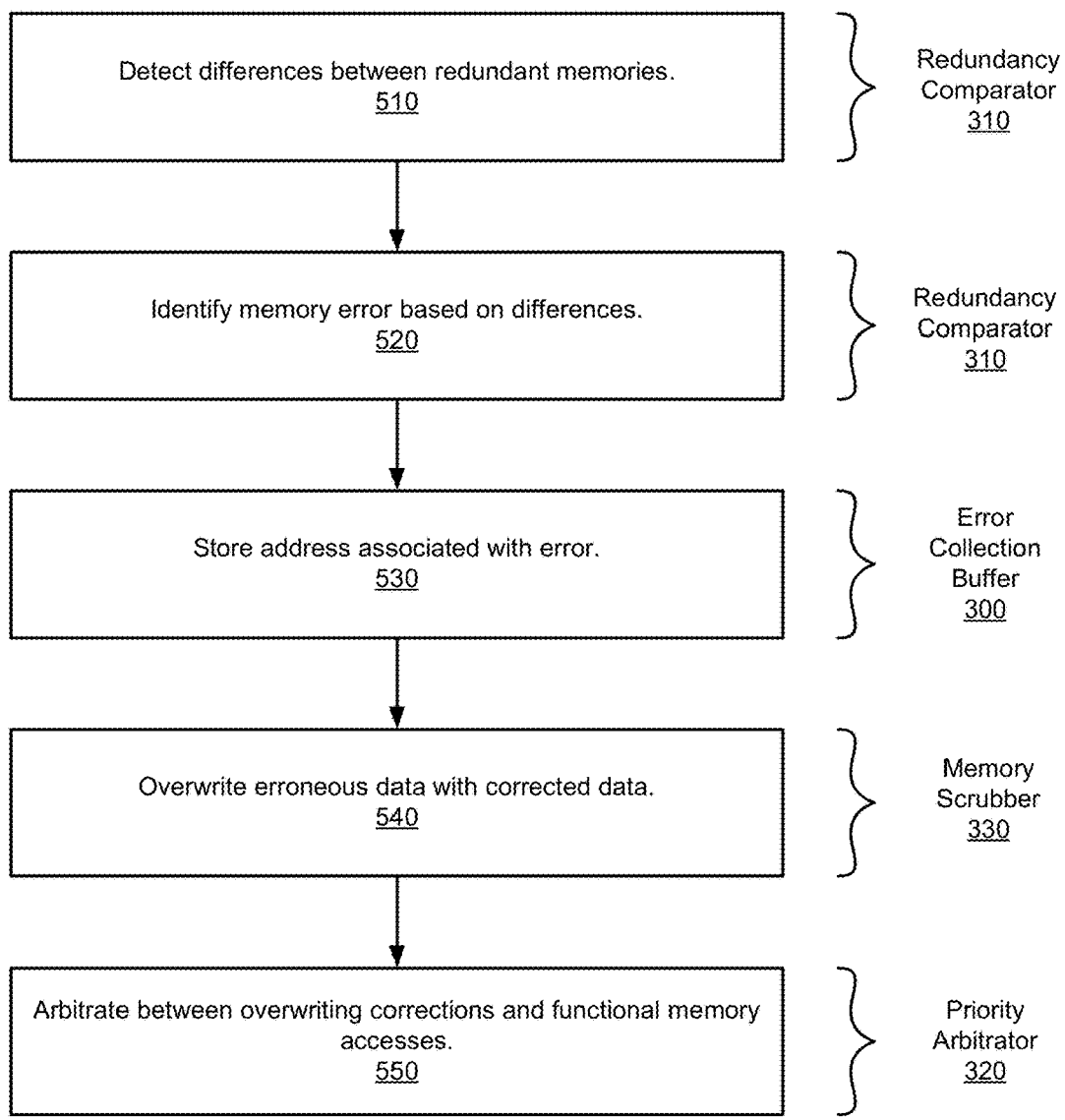
FIG. 5 is a flowchart illustrating a methodology for providing TMR radiation hardened memory, in accordance with an embodiment of the present disclosure.

FIG. 5 is a flowchart illustrating a methodology 500 for providing TMR radiation hardened memory, in accordance with an embodiment of the present disclosure. As can be seen, example method 500 includes a number of phases and sub-processes, the sequence of which may vary from one embodiment to another. However, when considered in aggregate, these phases and sub-processes form a process for providing TMR radiation hardened memory, in accordance with certain of the embodiments disclosed herein, for example as illustrated in FIGS. 1-4, as described above. However other system architectures can be used in other embodiments, as will be apparent in light of this disclosure. To this end, the correlation of the various functions shown in FIG. 5 to the specific components illustrated in the figures, is not intended to imply any structural and/or use limitations. Rather other embodiments may include, for example, varying degrees of integration wherein multiple functionalities are effectively performed by one system. Numerous variations and alternative configurations will be apparent in light of this disclosure.

In one embodiment, method 500 commences, at operation 510, by detecting differences between data stored redundantly in a first memory, a second memory, and a third memory.

At operation 520, a memory error is identified based on the detected differences and at operation 530, a memory address associated with the memory error is stored in an error collection memory.

At operation 540, memory scrubbing is performed in which the erroneous data is overwritten with corrected data, at the memory address associated with the memory error. In some embodiments, the memory overwrite operation is a Read-Modify-Write memory operation. In some embodiments, the corrected data is generated based on a majority vote performed among the first memory, the second memory, and the third memory.

At operation 550, arbitration is performed between the memory scrubbing operation and functional memory access associated with mission software execution (e.g., as performed by a processor configured to utilize the memory system). The arbitration is based on a priority associated with a tradeoff between the error correction activities of the memory scrubber to increase data reliability versus timely execution of the mission software.

Of course, in some embodiments, additional operations may be performed, as previously described in connection with the system. For example, if the memory error is associated with a Single Event Functional Interrupt (SEFI) condition, as opposed to a single bit error, the rate of operation of the memory scrubber circuit may be increased.

In some embodiments, copies of configuration registers of controllers associated with the first, second, and third memories may be stored in a local memory, and the configuration registers may be restored from the local memory copies in response to a determination that the memory error is associated with a SEFI condition.

In some embodiments, the overwriting may be cancelled in response to a detection that a functional write is being performed at the memory address associated with the memory error.

Example System

Figure 6:
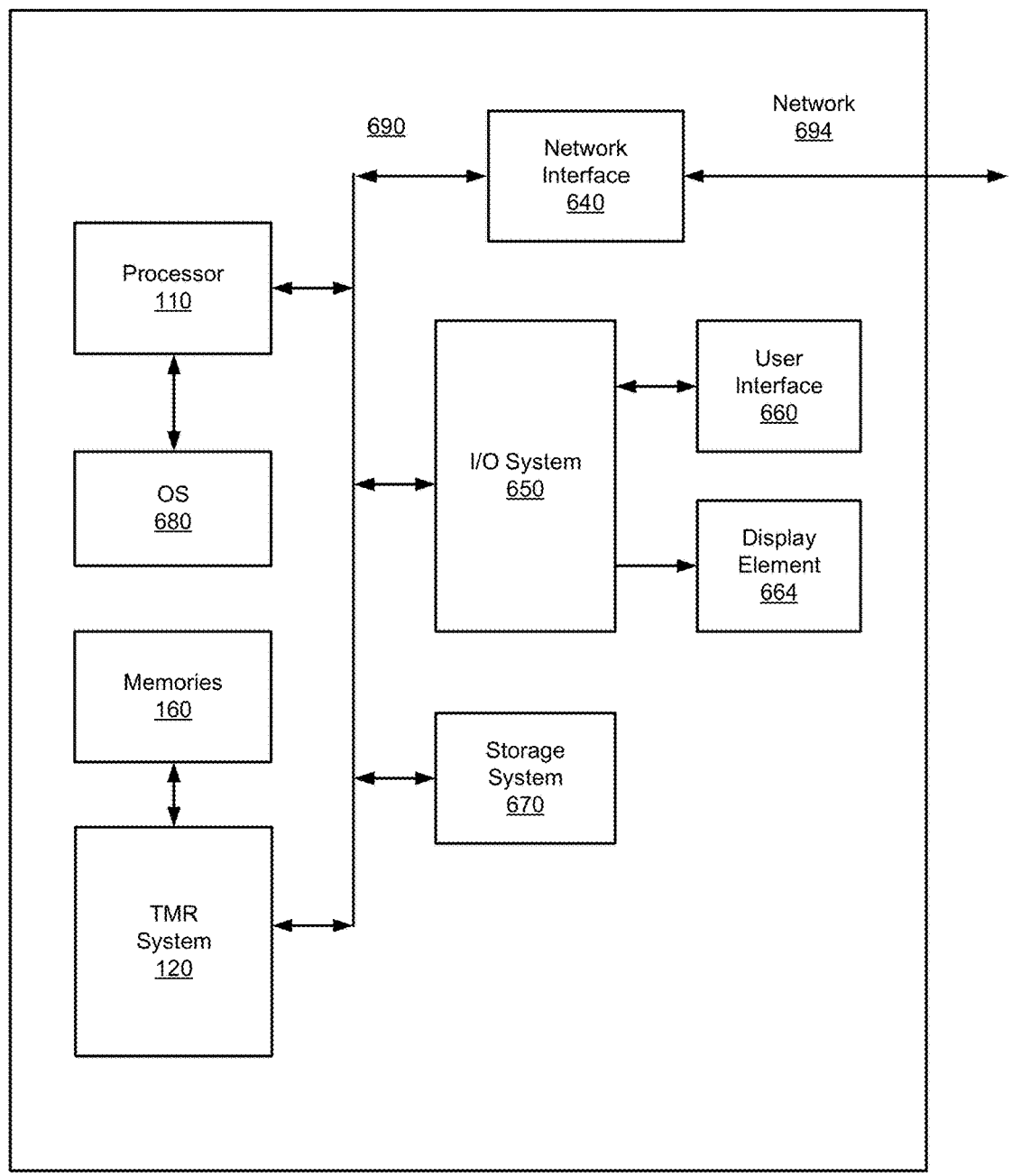
FIG. 6 is a block diagram of a processing platform configured to provide TMR radiation hardened memory, in accordance with an embodiment of the present disclosure.

FIG. 6 is a block diagram of a processing platform 600 configured to provide TMR radiation hardened memory, in accordance with an embodiment of the present disclosure. In some embodiments, platform 600, or portions thereof, may be hosted on, or otherwise be incorporated into the electronic systems of a space-based platform, including data communications systems, radar systems, computing systems, or embedded systems of any sort, where radiation hardening is particularly useful. The disclosed techniques may also be used to improve memory reliability in other platforms including data communication devices, personal computers, workstations, laptop computers, tablets, touchpads, portable computers, handheld computers, cellular telephones, smartphones, or messaging devices. Any combination of different devices may be used in certain embodiments.

In some embodiments, platform 600 may comprise any combination of a processor 110, memories 160a, 160b, 160c, TMR system 120, a network interface 640, an input/output (I/O) system 650, a user interface 660, a display element 664, and a storage system 670. As can be further seen, a bus and/or interconnect 690 is also provided to allow for communication between the various components listed above and/or other components not shown. Platform 600 can be coupled to a network 694 through network interface 640 to allow for communications with other computing devices, platforms, devices to be controlled, or other resources. Other componentry and functionality not reflected in the block diagram of FIG. 6 will be apparent in light of this disclosure, and it will be appreciated that other embodiments are not limited to any particular hardware configuration.

Processor 110 can be any suitable processor, and may include one or more coprocessors or controllers, such as an audio processor, a graphics processing unit, or hardware accelerator, to assist in the execution of mission software and/or any control and processing operations associated with platform 600. In some embodiments, the processor 110 may be implemented as any number of processor cores. The processor (or processor cores) may be any type of processor, such as, for example, a micro-processor, an embedded processor, a digital signal processor (DSP), a graphics processor (GPU), a tensor processing unit (TPU), a network processor, a field programmable gate array or other device configured to execute code. The processors may be multi-threaded cores in that they may include more than one hardware thread context (or "logical processor") per core. Processor 110 may be implemented as a complex instruction set computer (CISC) or a reduced instruction set computer (RISC) processor. In some embodiments, processor 110 may be configured as an x86 instruction set compatible processor.

Memory 160 comprises three redundant memories 160*a*, 160*b*, and 160*c*, as previously described, and can be implemented using any suitable type of digital storage including, for example, DDR3, DDR4, and/or DDR5 SDRAMs.

Storage system 670 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 670 may comprise technology to increase the storage performance enhanced protection for valuable digital media when multiple hard drives are included.

Processor 110 may be configured to execute an Operating System (OS) 680 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with platform 600, and therefore may also be implemented using any suitable existing or subsequently-developed platform.

Network interface circuit 640 can be any appropriate network chip or chipset which allows for wired and/or wireless connection between other components of platform 600 and/or network 694, thereby enabling platform 600 to communicate with other local and/or remote computing systems, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 650 may be configured to interface between various I/O devices and other components of platform 600. I/O devices may include, but not be limited to, user interface 660 and display element 664. User interface 660 may include devices (not shown) such as a touchpad, keyboard, and mouse, etc., for example, to allow the user to control the system. Display element 664 may be configured to display information to a user. I/O system 650 may include a graphics subsystem configured to perform processing of images for rendering on the display element 664. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 110 or any chipset of platform 600.

It will be appreciated that in some embodiments, the various components of platform 600 may be combined or integrated in a system-on-a-chip (SoC) architecture. In some embodiments, the components may be hardware components, firmware components, software components or any suitable combination of hardware, firmware or software.

TMR system 120 is configured to provide radiation hardened reliability for memories 160, as described previously. TMR system 120 may include any or all of the circuits/components illustrated in FIGS. 2-4, as described above. These components can be implemented or otherwise used in conjunction with a variety of suitable software and/or hardware that is coupled to or that otherwise forms a part of platform 600. These components can additionally or alternatively be implemented or otherwise used in conjunction with user I/O devices that are capable of providing information to, and receiving information and commands from, a user.

In various embodiments, platform 600 may be implemented as a wireless system, a wired system, or a combination of both. When implemented as a wireless system, platform 600 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 600 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 694. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 600 may comprise additional, fewer, or alternative subcomponents as compared to those included in the example embodiment of FIG. 6.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood, however, that other embodiments may be practiced without these specific details, or otherwise with a different set of details. It will be further appreciated that the specific structural and functional details disclosed herein are representative of example embodiments and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a memory system comprising: a redundancy comparator configured to detect differences between data stored redundantly in a first memory, a second memory, and a third memory, the redundancy comparator further configured to identify a memory error based on the detected differences; an error collection buffer configured to store a memory address associated with the memory error; a memory scrubber circuit configured to overwrite, at the memory address associated with the memory error, erroneous data with corrected data, the corrected data generated based on a majority vote performed among the first memory, the second memory, and the third memory; and a priority arbitrator configured to arbitrate between the overwriting performed by the memory scrubber and a functional memory access associated with software execution performed by a processor configured to utilize the memory system.

Example 2 includes the memory system of Example 1, further comprising a microcontroller configured to monitor the error collection buffer and trigger operation of the memory scrubber circuit in response to the memory error.

Example 3 includes the memory system of Example 2, wherein the microcontroller is configured to set a priority for the priority arbitrator based on a tradeoff between the overwriting performed by the memory scrubber and the functional memory access.

Example 4 includes the memory system of Examples 2 or 3, wherein the microcontroller is configured to determine that the memory error is associated with a Single Event Functional Interrupt (SEFI) condition, and to increase a rate of operation of the memory scrubber circuit in response to the determination.

Example 5 includes the memory system of Example 4, wherein the microcontroller comprises a local memory and the microcontroller is configured to store copies of configuration registers of controllers associated with the first memory, the second memory, and the third memory in the local memory, and to restore the configuration registers based on the stored copies in response to the determination that the memory error is associated with a SEFI condition.

Example 6 includes the memory system of Examples 4 or 5, wherein the microcontroller is configured to power cycle one or more of the first memory, the second memory, and the third memory in response to the determination that the memory error is associated with a SEFI condition.

Example 7 includes the memory system of any of Examples 1-6, wherein the memory scrubber circuit is configured to cancel the overwrite in response to detection that a functional write is being performed at the memory address associated with the memory error.

Example 8 is a space-based processing system comprising: a processor configured to execute mission software; and a memory system comprising: a redundancy comparator configured to detect differences between data stored redundantly in a first memory, a second memory, and a third memory, the redundancy comparator further configured to identify a memory error based on the detected differences, an error collection buffer configured to store a memory address associated with the memory error, a memory scrubber circuit configured to overwrite, at the memory address associated with the memory error, erroneous data with corrected data, the corrected data generated based on a majority vote performed among the first memory, the second memory, and the third memory, and a priority arbitrator configured to arbitrate between the overwriting performed by the memory scrubber and a functional memory access associated with the mission software execution.

Example 9 includes the space-based processing system of Example 8, wherein the memory system comprises a microcontroller configured to monitor the error collection buffer and trigger operation of the memory scrubber circuit in response to the memory error.

Example 10 includes the space-based processing system of Example 9, wherein the microcontroller is configured to set a priority for the priority arbitrator based on a tradeoff between the overwriting performed by the memory scrubber and the functional memory access.

Example 11 includes the space-based processing system of Examples 9 or 10, wherein the microcontroller is configured to determine that the memory error is associated with a Single Event Functional Interrupt (SEFI) condition, and to increase a rate of operation of the memory scrubber circuit in response to the determination.

Example 12 includes the space-based processing system of Example 11, wherein the microcontroller comprises a local memory and the microcontroller is configured to store copies of configuration registers of controllers associated with the first memory, the second memory, and the third memory in the local memory, and to restore the configuration registers based on the stored copies in response to the determination that the memory error is associated with a SEFI condition.

Example 13 includes the space-based processing system of Examples 11 or 12, wherein the microcontroller is configured to power cycle one or more of the first memory, the second memory, and the third memory in response to the determination that the memory error is associated with a SEFI condition.

Example 14 includes the space-based processing system of any of Examples 8-13, wherein the memory scrubber circuit is configured to cancel the overwrite in response to detection that a functional write is being performed at the memory address associated with the memory error.

Example 15 is a method for providing radiation hardened memory, the method comprising: detecting, by a redundancy comparator, differences between data stored redundantly in a first memory, a second memory, and a third memory; identifying, by the redundancy comparator, a memory error based on the detected differences; storing, by an error collection buffer, a memory address associated with the memory error; generating, by a memory scrubber circuit, corrected data based on a majority vote performed among the first memory, the second memory, and the third memory; overwriting, by the memory scrubber circuit, erroneous data with the corrected data, at the memory address associated with the memory error; and arbitrating, by a priority arbitrator, between the overwriting performed by the memory scrubber and a functional memory access associated with software execution performed by a processor configured to utilize the memory system.

Example 16 includes the method of Example 15, further comprising setting a priority for the priority arbitrator based on a tradeoff between the overwriting performed by the memory scrubber and the functional memory access.

Example 17 includes the method of Examples 15 or 16, further comprising determining that the memory error is associated with a Single Event Functional Interrupt (SEFI) condition and increasing a rate of operation of the memory scrubber circuit in response to the determination.

Example 18 includes the method of Example 17, further comprising storing copies of configuration registers of controllers associated with the first memory, the second memory, and the third memory in a local memory, and restoring the configuration registers based on the stored copies in response to the determination that the memory error is associated with a SEFI condition.

Example 19 includes the method of Examples 17 or 18, further comprising power cycling one or more of the first memory, the second memory, and the third memory in response to the determination that the memory error is associated with a SEFI condition.

Example 20 includes the method of any of Examples 15-19, further comprising canceling the overwrite in response to detection that a functional write is being performed at the memory address associated with the memory error.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A memory system comprising:
    a redundancy comparator configured to detect differences between data stored redundantly in a first memory, a second memory, and a third memory, the redundancy comparator further configured to identify a memory error based on the detected differences;
    an error collection buffer configured to store a memory address associated with the memory error;
    a memory scrubber circuit configured to overwrite, at the memory address associated with the memory error, erroneous data with corrected data, the corrected data generated based on a majority vote performed among the first memory, the second memory, and the third memory; and
    a priority arbitrator configured to arbitrate between the overwriting performed by the memory scrubber and a functional memory access associated with software execution performed by a processor configured to utilize the memory system.

2. The memory system of claim 1, further comprising a microcontroller configured to monitor the error collection buffer and trigger operation of the memory scrubber circuit in response to the memory error.

3. The memory system of claim 2, wherein the microcontroller is configured to set a priority for the priority arbitrator based on a tradeoff between the overwriting performed by the memory scrubber and the functional memory access.

4. The memory system of claim 2, wherein the microcontroller is configured to determine that the memory error is associated with a Single Event Functional Interrupt (SEFI) condition, and to increase a rate of operation of the memory scrubber circuit in response to the determination.

5. The memory system of claim 4, wherein the microcontroller comprises a local memory and the microcontroller is configured to store copies of configuration registers of controllers associated with the first memory, the second memory, and the third memory in the local memory, and to restore the configuration registers based on the stored copies in response to the determination that the memory error is associated with a SEFI condition.

6. The memory system of claim 4, wherein the microcontroller is configured to power cycle one or more of the first memory, the second memory, and the third memory in response to the determination that the memory error is associated with a SEFI condition.

7. The memory system of claim 1, wherein the memory scrubber circuit is configured to cancel the overwrite in response to detection that a functional write is being performed at the memory address associated with the memory error.

8. A space-based processing system comprising:
    a processor configured to execute mission software; and
    a memory system comprising:
        a redundancy comparator configured to detect differences between data stored redundantly in a first memory, a second memory, and a third memory, the redundancy comparator further configured to identify a memory error based on the detected differences,
        an error collection buffer configured to store a memory address associated with the memory error, a memory scrubber circuit configured to overwrite, at the memory address associated with the memory error, erroneous data with corrected data, the corrected data generated based on a majority vote performed among the first memory, the second memory, and the third memory, and a priority arbitrator configured to arbitrate between the overwriting performed by the memory scrubber and a functional memory access associated with the mission software execution.

9. The space-based processing system of claim 8, wherein the memory system comprises a microcontroller configured to monitor the error collection buffer and trigger operation of the memory scrubber circuit in response to the memory error.

10. The space-based processing system of claim 9, wherein the microcontroller is configured to set a priority for the priority arbitrator based on a tradeoff between the overwriting performed by the memory scrubber and the functional memory access.

11. The space-based processing system of claim 9, wherein the microcontroller is configured to determine that the memory error is associated with a Single Event Functional Interrupt (SEFI) condition, and to increase a rate of operation of the memory scrubber circuit in response to the determination.

12. The space-based processing system of claim 11, wherein the microcontroller comprises a local memory and the microcontroller is configured to store copies of configuration registers of controllers associated with the first memory, the second memory, and the third memory in the local memory, and to restore the configuration registers based on the stored copies in response to the determination that the memory error is associated with a SEFI condition.

13. The space-based processing system of claim 11, wherein the microcontroller is configured to power cycle one or more of the first memory, the second memory, and the third memory in response to the determination that the memory error is associated with a SEFI condition.

14. The space-based processing system of claim 8, wherein the memory scrubber circuit is configured to cancel the overwrite in response to detection that a functional write is being performed at the memory address associated with the memory error.

15. A method for providing radiation hardened memory, the method comprising:
   detecting, by a redundancy comparator, differences between data stored redundantly in a first memory, a second memory, and a third memory;
   identifying, by the redundancy comparator, a memory error based on the detected differences;
   storing, by an error collection buffer, a memory address associated with the memory error;
   generating, by a memory scrubber circuit, corrected data based on a majority vote performed among the first memory, the second memory, and the third memory;
   overwriting, by the memory scrubber circuit, erroneous data with the corrected data, at the memory address associated with the memory error; and
   arbitrating, by a priority arbitrator, between the overwriting performed by the memory scrubber and a functional memory access associated with software execution performed by a processor configured to utilize the memory system.

16. The method of claim 15, further comprising setting a priority for the priority arbitrator based on a tradeoff between the overwriting performed by the memory scrubber and the functional memory access.

17. The method of claim 15, further comprising determining that the memory error is associated with a Single Event Functional Interrupt (SEFI) condition and increasing a rate of operation of the memory scrubber circuit in response to the determination.

18. The method of claim 17, further comprising storing copies of configuration registers of controllers associated with the first memory, the second memory, and the third memory in a local memory, and restoring the configuration registers based on the stored copies in response to the determination that the memory error is associated with a SEFI condition.

19. The method of claim 17, further comprising power cycling one or more of the first memory, the second memory, and the third memory in response to the determination that the memory error is associated with a SEFI condition.

20. The method of claim 15, further comprising canceling the overwrite in response to detection that a functional write is being performed at the memory address associated with the memory error.

* * * * *